O. A. PARKER.
WHEEL FOR VEHICLES.
APPLICATION FILED JAN. 3, 1916.
1,227,651.
Patented May 29, 1917.
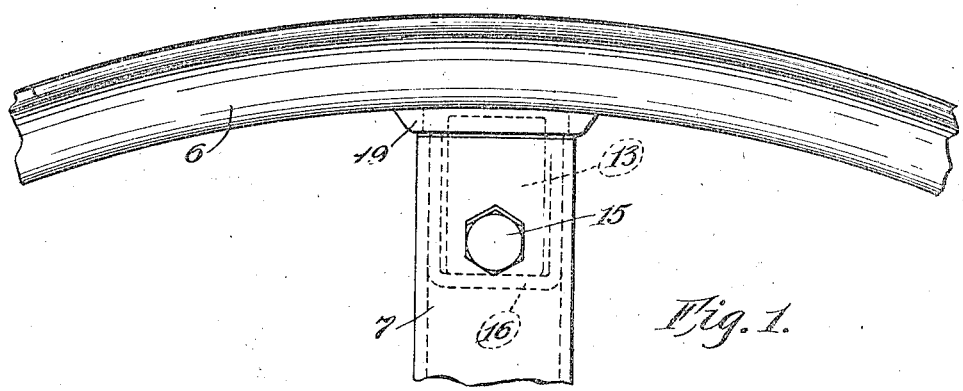
Fig. 1.
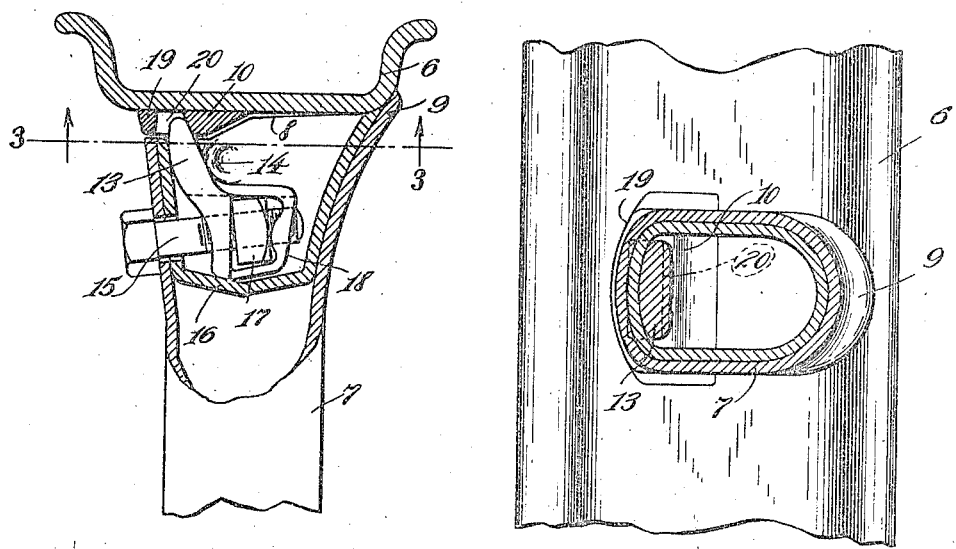
Fig. 2.
Fig. 3.
INVENTOR,
Orel A. Parker,
By Hull, Smith, Brock & West
ATT'YS.

UNITED STATES PATENT OFFICE.

ORREL A. PARKER, OF CLEVELAND, OHIO.

WHEEL FOR VEHICLES.

1,227,851.    Specification of Letters Patent.    Patented May 29, 1917.

Application filed January 3, 1916. Serial No. 69,712.

*To all whom it may concern:*

Be it known that I, ORREL A. PARKER, a citizen of the United States, residing at Cleveland, in the county of Cuyahoga and State of Ohio, have invented a certain new and useful Improvement in Wheels for Vehicles, of which the following is a full, clear, and exact description, reference being had to the accompanying drawings.

In my pending application Serial No. 29,690 filed May 21, 1915, there is disclosed an invention relating to means whereby demountable rims may be conveniently applied directly to the ends of the spokes of a wheel and easily detached therefrom, a characteristic feature being that the fastening devices are contained within the ends of the spokes and engage the rim for holding the same on the spokes.

The present invention relates to the type of structure disclosed in said application, and has for its object to provide means for substantially closing the joint between the spokes and the rim, whereby the entry of mud, water and the like into the spokes is largely prevented, and the appearance of the joint is also improved.

In the application above referred to an opening or recess is produced or exhibited at the joint between the rim and the outer end of each spoke. In a preferred embodiment of the present invention the opening is closed by means of a lip or projection extending inwardly from the rim.

In the accompanying drawings, Figure 1 is a side elevation of a part of a rim and spoke, showing the joint; Fig. 2 is a cross section; and Fig. 3 is a section on the line 3—3 of Fig. 2.

Without describing the structure with the particularity found in the above mentioned application, it may be stated that the rim is indicated at 6, and the hollow spokes at 7, each flared at its outer end and cut or beveled off on transverse planes, as indicated at 8, producing an extended portion 9 at one side against or toward which the rim is forced by the fastening devices. On the opposite side a shorter spoke end is produced, forming a space between said end and the adjacent part of the rim. A block 10 is fastened to the inner surface of the rim, to receive the pressure of a clip or fastening member 13 which has a pivotal or rocking movement around bosses 14 formed on the inside of the spoke, the locking member being actuated by a cap bolt 15 inserted through a hole in the side of the spoke and through a reinforcing member or cup 16 set into the end of the spoke. This bolt 15 engages a nut 17 in a cage 18 at the inner end of the clip. When the bolt is taken up the travel of the nut thereon presses the outer end of the clip against the block 10 and forces the rim laterally to its seat against the extending portion or flange 9, the outer side of the rim being supported through the engagement of the beveled outer surface of the block body 10 with the corresponding portion of the clip and the latter in turn being supported by the outer sides of the cup 16 and of the spoke end. When the bolt is let off the outward travel of the nut turns the locking member and withdraws the same inwardly or downwardly to release the rim.

In the present instance, the block is formed with a projecting lip or flange 19 which extends around a recess 20 provided between the flange and the body of the block and into which the toe of the clip 13 projects, and this lip or flange is of proper size to fill or substantially close the opening between the adjacent end of the spoke and the inside of the rim. Therefore, when the rim is assembled on the spokes in the manner described, the openings referred to are practically closed by the lips, and the narrow slots remaining may be completely closed by the paint and varnish applied to the wheel, thereby producing, or having the effect of, a solid or continuous rim and spokes, with a tight joint which will prevent mud, water, and other substances, from entering the cups which contain the locking devices.

Having thus described my invention, what I claim is:—

1. In a wheel, the combination of a rim, spokes each having a hollow outer end, a movable rim-engaging member within each spoke end, and means on the rim to close the joint between the same and the end of the spoke.

2. In a wheel, the combination of a rim, spokes each having a hollow outer end spaced at one side from the rim, means to attach the rim to the spokes, and means carried by the rim and fitting within said spaces to substantially close the same.

3. In a wheel, the combination of a rim, spokes within the same each having a hollow outer end spaced at one side from the rim, means in the hollow ends of the spokes to fasten the same to the rim, and flanges projecting from the rim into said spaces to substantially close the same.

4. In a wheel, the combination of a rim, blocks on the inner side thereof each having a recess and an inwardly projecting flange beside said recess, spokes having hollow outer ends and each spaced on one side from the rim to receive said flange, and means to fasten the rim to the spokes, said means including clips projecting into said recesses.

5. In a wheel, the combination of a rim, spokes each having an end provided at one side with a rim-engaging portion and having its opposite side spaced from the rim, means carried by the rim and the spoke ends for securing the rim to the spokes with the rim engaging the aforesaid spoke end portions, and projections on the rim substantially filling such spaces.

6. In a wheel, the combination of a plurality of spokes each having a hollow outer end provided at one side with a rim engaging portion, a rim having recesses on the side opposite that which is engaged by such rim-engaging portions, members in said spoke ends movable outwardly into such recesses, and means whereby the members may be so moved.

7. In a wheel, the combination of a spoke having at one side thereof a rim-engaging portion and the opposite side of said spoke being at a shorter distance from the center or hub of the wheel than such rim-engaging portion, a rim having a portion adapted to be engaged by said rim-engaging portion and having an inclined portion on the side opposite the first mentioned portion, a movable rim-engaging member in the outer end of said spoke adapted to be moved into engagement with such inclined surface, means for so moving said member, and a radially projecting lip or flange carried by the rim and laterally spaced from the inclined portion and adapted to substantially bridge the space between the body of the rim and the shorter side of the spoke.

8. The combination, with a spoke having a hollow end provided with a rim-engaging portion, of a rim adapted to engage such portion of the spoke end, a movable rim-engaging member within such spoke end adapted to engage another portion of such spoke end, and means substantially closing the joint between the spoke end and the rim.

In testimony whereof, I hereunto affix my signature.

ORREL A. PARKER.